United States Patent
Tang

(10) Patent No.: US 10,349,102 B2
(45) Date of Patent: Jul. 9, 2019

(54) DISTRIBUTING EMBEDDED CONTENT WITHIN VIDEOS HOSTED BY AN ONLINE SYSTEM

(71) Applicant: Facebook, Inc., Menlo Park, CA (US)

(72) Inventor: Yi Tang, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 62 days.

(21) Appl. No.: 15/166,581

(22) Filed: May 27, 2016

(65) Prior Publication Data

US 2017/0347142 A1    Nov. 30, 2017

(51) Int. Cl.
| | |
|---|---|
| *H04N 21/24* | (2011.01) |
| *H04N 21/234* | (2011.01) |
| *H04N 21/2743* | (2011.01) |
| *H04N 21/258* | (2011.01) |
| *G06F 16/71* | (2019.01) |
| *G06F 16/738* | (2019.01) |
| *G06F 16/783* | (2019.01) |
| *H04N 21/858* | (2011.01) |

(52) U.S. Cl.
CPC ......... *H04N 21/2407* (2013.01); *G06F 16/71* (2019.01); *G06F 16/738* (2019.01); *G06F 16/7834* (2019.01); *G06F 16/7837* (2019.01); *H04N 21/23418* (2013.01); *H04N 21/25883* (2013.01); *H04N 21/2743* (2013.01); *H04N 21/8586* (2013.01)

(58) Field of Classification Search
CPC ............. H04N 21/8586; H04N 21/442; H04N 21/433; H04N 21/466; H04N 21/251; H04N 21/44204; H04N 21/47217; H04N 21/4782; H04N 21/6125; H04N 21/6175; H04N 21/6581; H04N 21/812; H04N 21/23418; H04N 21/2407; H04N 21/2668; H04N 21/233; H04N 21/2353; H04N 21/25883; H04N 21/273; H04L 67/20; H04L 67/22; H04L 67/02; H04L 65/60; G06F 17/30846; G06F 17/30887; G06F 17/3089; G06F 17/3082; G06F 17/30787; G06F 17/3079; G06F 17/3084; G06F 17/30858; G06Q 30/0243; G06Q 30/0242
See application file for complete search history.

(56) References Cited

U.S. PATENT DOCUMENTS

| | | | | |
|---|---|---|---|---|
| 7,043,473 B1 * | 5/2006 | Rassool | ............ | G06F 17/30743 |
| 2001/0044745 A1 * | 11/2001 | Shaw | ............ | G06Q 30/02 705/14.66 |
| 2002/0053078 A1 * | 5/2002 | Holtz | ............ | G06Q 30/06 725/14 |

(Continued)

*Primary Examiner* — Chenea Davis
(74) *Attorney, Agent, or Firm* — Fenwick & West LLP

(57) ABSTRACT

An online system analyzes videos from video hosting systems to identify embedded contents in the videos. The online system associates embedded content with videos that include the embedded content. The online system determines statistics describing distribution of the embedded content by the video hosting system, for example, the rate at which the embedded content is included in videos and demographics of the users targeted for the embedded content. The online system may use the information describing distribution of the embedded content by other video hosting systems to modify the distribution of embedded content by the online system.

20 Claims, 6 Drawing Sheets

(56) References Cited

U.S. PATENT DOCUMENTS

| | | | |
|---|---|---|---|
| 2004/0216161 A1* | 10/2004 | Barone, Jr. | H04H 20/14 |
| | | | 725/46 |
| 2005/0022252 A1* | 1/2005 | Shen | G06F 17/30017 |
| | | | 725/135 |
| 2007/0199040 A1* | 8/2007 | Kates | H04N 5/76 |
| | | | 725/134 |
| 2012/0078689 A1* | 3/2012 | Rothschild | G06Q 30/02 |
| | | | 705/14.1 |
| 2014/0222549 A1* | 8/2014 | Bruich | H04H 60/33 |
| | | | 705/14.41 |
| 2015/0189351 A1* | 7/2015 | Kitts | G06Q 30/0242 |
| | | | 725/19 |

* cited by examiner

DISTRIBUTING EMBEDDED CONTENT WITHIN VIDEOS HOSTED BY AN ONLINE SYSTEM

BACKGROUND

This invention relates generally to distribution of content by online systems, and in particular to distribution of content embedded within videos hosted by an online system.

Online systems distribute content to users, for example, video or audio content. Content distributed by an online system often includes embedded content. For example, a video hosted by the online system may include a short embedded video that is unrelated to the content of the video. An online system may analyze distribution of embedded content in videos provided other video hosting systems, for example, to determine how frequently the embedded content is distributed to users. However, video hosting systems typically do not provide application programming interfaces or other mechanisms to retrieve this information. Online systems may obtain this information by using services of experts that know about various video hosting systems through their personal knowledge or contacts. However, services of such experts are typically expensive. Furthermore, the knowledge and contacts of these experts may become outdated with changes in the industry. Therefore, conventional techniques for obtaining information describing distribution of embedded content by a video hosting system are often inadequate.

SUMMARY

Embodiments of the invention analyze content embedded within videos hosted by external video hosting systems to determine statistics describing the embedded content. Examples of embedded content items include short videos embedded within a longer video or a banner or overlay image shown while a video is shown. The online system retrieves videos from an external video hosting system. The online system identifies embedded content items in the videos retrieved and extracts the embedded content items from the videos. In an embodiment, the online system, determines a unique identifier for each extracted embedded content item and stores an index mapping the identifier of each embedded content item to identifiers of videos that include the embedded content item. For example, if a banner is embedded in a plurality of videos, the index stores associations between an identifier of the banner and identifiers of each of the plurality of videos.

The online system identifies videos that include a particular embedded content item. The online system interacts with the external video hosting system to determine a rate at which the external video hosting system distributes specific videos including the embedded content item. The online system aggregates the rates of distribution of the embedded content item across different videos to determine an overall rate of distribution of the embedded content item.

In some embodiments, the online system determines periodic variations in the rate at which the embedded content item is included in videos. For example, the online system determines an estimate of the rate at which the embedded content is included in videos at different times of the day or on different days of the week. The online system presents information describing the rate of distribution of the embedded content item, for example, as a histogram.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

1. Overview

Figure 1:
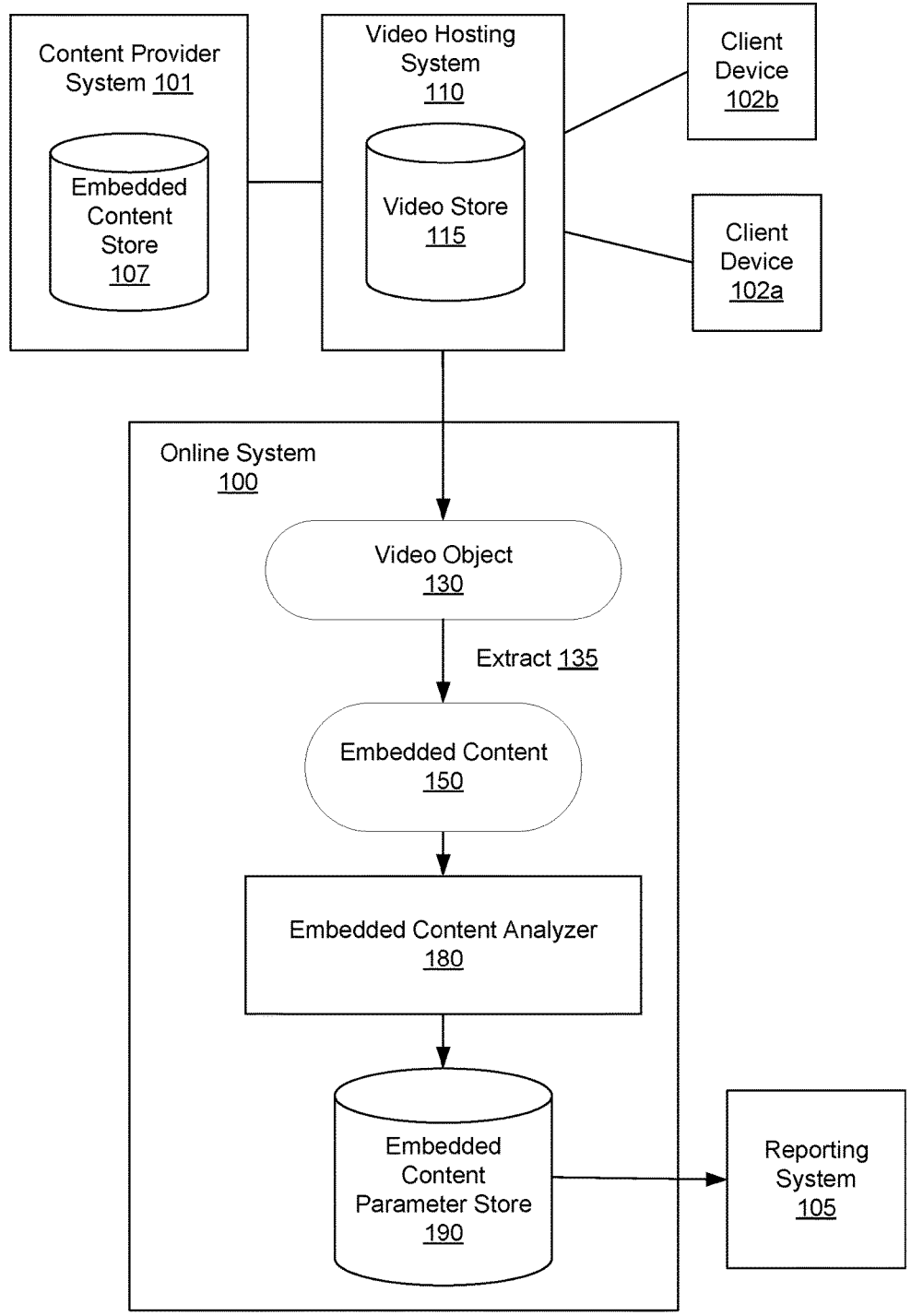
FIG. 1 is a block diagram of an overall system environment in which an online system 100 operates, in accordance with an embodiment of the invention.

FIG. 1 is a high level block diagram of a system environment for an online system 100. The online system 100 may also be referred to as an embedded content analysis system or an analysis system. The system environment shown by FIG. 1 comprises a content provider system 101, one or more client devices 102, an online system 103, a video hosting system 110 (a video hosting system is also referred to as a video server), and a reporting system 105. In alternative configurations, different and/or additional components may be included in the system environment. In some embodiments, the online system 100 is a social networking system.

The client devices 102 are one or more computing devices capable of receiving user input as well as transmitting and/or receiving data from the video hosting system 110 or the online system 100. Users access the video hosting system 110 using the client devices 102. The video hosting system 110 sends one or more videos to the client devices 102. The videos sent by the video hosting system 110 may include embedded content, for example, content received from the content provider system 101. For example, a video hosted by the video hosting system 110 may embed a short video within the hosted video. Alternatively, the video may show an embedded image, a banner, a uniform resource locator (URL) link, as the video is played. An online system may receive revenue by embedding content from other content providers or vendors.

The video hosting system 110 hosts videos and provides the videos to client devices. A video hosting system is also referred to herein as an external video hosting system. In an embodiment, the video hosting system 110 receives a request identifying a specific video from client devices 102. The client device may identify the specific video using a URL addressing the video or by specifying an identifier that uniquely identifies the video. The video hosting system 110 identifies the requested video and sends content of the video to the client device 102. In one embodiment, a client device 102 is a conventional computer system, such as a desktop or laptop computer. Alternatively, a client device 102 may be a device having computer functionality, such as a personal digital assistant (PDA), a mobile telephone, a smartphone or another suitable device.

The video hosting system 110 receives content from content provider systems 101. The content provider system 101 stores content in content store 107. The content provider system 101 provides content stored in content store 107 to the video hosting system 110 for including as embedded content in videos hosted by the video hosting system 110. The content provided by content provider system 101 may be promotional content or sponsored content that describes a product or service offered by a content provider or any vendor.

The content provider system 101 may specify parameters describing how the content provided to the video hosting system 110 should be distributed. In an embodiment, the content provider system is associated with user or users that manage policies associated with distribution of content provided by the content provider system 101. For example, a content provider system 101 may be associated with a vendor, an enterprise, or a business and content items provided by the content provider system 101 may be associated with products or services offered by the associated vendor, enterprise, or business.

In an embodiment, the content provider system 101 provides information describing the rate at which the embedded content should be distributed, a total number of videos in which the embedded content should be included, the demographics of the target audience receiving the content, the time of distribution of the content including the time of the day or days of the week, and so on. For example, the content provider system 101 may specify that the embedded content should be included in a given number of videos per day. The content provider system 101 may specify demographic attributes of the targeted users, for example, users within a particular age group, users having a particular gender, ethnicity, financial status, and so on.

The video hosting system 110 hosts videos and stores videos in video store 115. The video hosting system 110 receives content from content provider system 101 and embeds the content in videos shown to users. In some embodiments, the video hosting system 110 stores user profiles or user accounts. The video hosting system 110 allows users to register and log in to the video hosting system. The video hosting system 110 determines the type of embedded content presented to a user based on the user profile information. For example, a user with a particular set of user profile attributes may be shown a particular embedded content item when the user views a video whereas another user with a different set of user profile attributes may be shown another embedded content item selected based on the other user's user profile attributes. For example, a person with a female gender may be shown a first embedded content item when presented with a video and a person with a male gender may be shown a different embedded content item when presented with the same video.

The video hosting system 110 may also receive from the content provider system 101, information describing how the content should be distributed to users of the video hosting system. For example, the video hosting system 110 receives parameters describing how often the embedded content is included in videos sent to users of the video hosting system 110, targeting criteria describing the user profile attributes of users that receive the embedded content, and so on. In some embodiments, the targeting criteria describing the types of users is based on demographic attributes of users like location, languages spoken, age, gender, ethnicity, attributes describing connections of the user, and so on. The video hosting system 110 sends embedded content to users at a rate defined by the content provider and to users satisfying the targeting criteria associated with the embedded content.

In an embodiment, users associated with the video hosting system 110 may receive compensation from the users associated with content provider system 101 for distribution of embedded content provided by the video hosting system 110. The amount of compensation depends on the distribution of the embedded content item, for example, based on a rate at which the embedded content item is distributed. The embedded content provider system 101 specifies a budget towards the cost of showing the embedded content via videos of the video hosting system 110. Accordingly, the budget determines the rate at which embedded content is included in videos. For example, higher budget allows the video hosting system 110 to include embedded content from the content provider system 101 at a higher rate.

The video object 130 is a representation of a video received from the external video hosting system 110. In some embodiments, the video object 130 represents a set of image frames shown via a display of a computing device at a given rate of change of frames. Embedded content 150 may be received by the video hosting system 110 from a content provider system 101 that is distinct from content providers that provides content for the video hosting system. For example, videos hosted by the video hosting system 110 may be uploaded by individual users whereas the embedded content may be provided by content providers associated with products or services described in the embedded content.

An embedded content item may be embedded in the beginning of a video, in the middle, or at the end of the video. An embedded content item embedded in the beginning of the video is referred to as a pre-roll video, an embedded content item embedded in the middle of the video is referred to as a mid-roll video, and an embedded content item embedded at the end of the video is referred to as a post-roll video.

The online system 100 analyzes videos of the video hosting system to determine information describing distribution of embedded content items by the video hosting system 110. The online system 100 interacts with the external video hosting system 110 to receive videos from the external video hosting system 110. In an embodiment, the online system 100 interacts with the external video hosting system 110 as a user of the external video hosting system 110. The online system receives videos from external video hosting system 110, extracts embedded content 150 from the videos, and analyzes the embedded content 150. The online system 100 analyzes the embedded content to identify a content provider of the embedded content, demographics of users targeted using the embedded content, information describing a rate of distribution of the embedded content, and so on.

In some embodiments, the online system 100 sends results of analysis of an embedded content 150 to reporting system 105. The reporting system 105 may be used by personnel from the sales and/or marketing department of businesses associated with the online system 100 to analyze the parameters describing distribution of the embedded content. The online system 100 may also act as a video hosting system that provides videos to users of the online system 100. In an embodiment, the online system uses the information describing the distribution of the embedded content item to determine a rate of distribution of the embedded content item via videos served by the online system 100. The online system 100 may distribute the embedded content item and/or modify the rate of distribution of the embedded content item subject to an approval by a user of the content provider system 101.

The various systems shown in FIG. 1 communicate with each other via a network (not shown in FIG. 1). The network may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 104 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network may be encrypted using any suitable technique or techniques.

System Architecture

Figure 2:
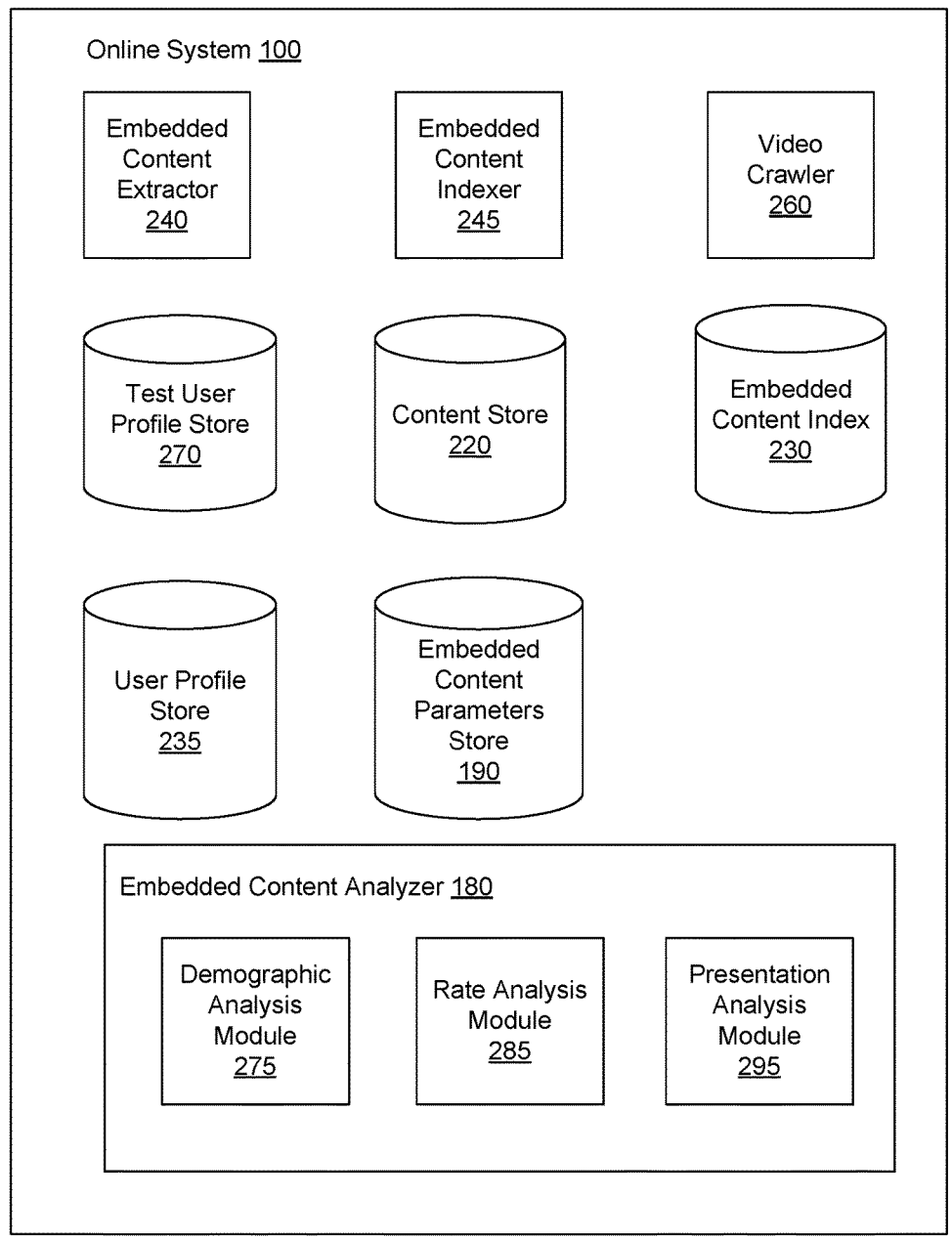
FIG. 2 is a block diagram of overall system architecture of an online system, in accordance with an embodiment of the invention.

FIG. 2 is a block diagram of overall system architecture of an online system, in accordance with an embodiment of the invention. The online system 100 comprises an embedded content extractor 240, an embedded content indexer 245, a video crawler 260, a user profile store 235, a test user profile store 270, a content store 220, an embedded content index 230, an embedded content parameters store 190, and an embedded content analyzer 180.

The video crawler 260 accesses one or more video hosting systems 110 and retrieves videos from the video hosting systems. For each video hosting system 110, the video crawler 260 retrieves various videos hosted by the video hosting system and uniquely identifies each of those videos and stores them in the content store 220. The video crawler invokes application programming interface (API) of the video hosting system 110 to retrieve videos from the video hosting system 110. In an embodiment, the video crawler 260 receives a list of videos to be retrieved. The list may be received as a text file storing information identifying each video, for example, as a URL. The video crawler 260 retrieves the information identifying each video from the received list and invokes an API of the video hosting system 110 to retrieve the content of the video. In an embodiment, the video hosting system 110 provides APIs to receive information identifying videos related to a given video, for example, videos that are in a related album or videos that are similar to the given video. In this embodiment, the video crawler 260 retrieves a set of vides related to a given video and adds them to the list. As the video crawler 260 processes the list, the video crawler 260 accesses these related videos as well. The process is repeated for each video in the list. Accordingly, the video crawler 260 identifies videos related to a related video and so on. The video crawler 260 tracks the videos that have been previously accessed. Accordingly, if information identifying the same video is received multiple times, the video crawler 260 accesses the video only once.

The embedded content extractor 240 receives a video and identifies and extracts any embedded content items within the video. The embedded content extractor 240 extracts the embedded content from a video by identifying differences in the video and the embedded content. In one embodiment, embedded content extractor 240 determines that the video includes embedded content based on a difference in the volume of audio of that portion of the video compared to the rest of the video. In one embodiment, embedded content extractor 240 compares audio associated with subsequent frames of the video. If the embedded content extractor 240 identifies that the difference between audio associated with two consecutive frames or two frames occurring within a close time interval exceeds a threshold value, the embedded content extractor 240 marks one of the frames as being associated with an embedded content item. For example, the embedded content extractor 240 may identify one of the identified frames as the start of an embedded content item or an end of the embedded content item in the video.

In an embodiment, the embedded content extractor 240 starts processing the frames of the video from the beginning of the video and identifies a first pair of frames associated with a difference in audio exceeding the threshold. The embedded content extractor 240 marks the second frame of the pair as the start of the embedded content item. If the embedded content extractor 240 subsequently identifies a second pair of frame associated with a change in audio while continuing to process the frames, the embedded content extractor 240 marks the first frame of the second pair as the end of the embedded content item. The embedded content extractor 240 continues processing the frames of the video to identify other embedded content items.

In another embodiment, embedded content extractor 240 determines that a portion of a video is embedded content based on differences in properties of the images of the portion of video compared to the images in the rest of the video. Examples of properties of the images considered by the embedded content extractor 240 include differences in brightness, contrast, saturation, sharpness, etc.

In another embodiment, the embedded content extractor 240 may determine that a segment of the video is embedded content by matching information from the audio or images of the video with predetermined stored characteristics of embedded content. For example, the embedded content extractor 240 obtains from a user, various keywords, audio, or images that are expected in embedded content. The embedded content extractor 240 receives an audio of certain musical pattern or a song that is expected in embedded content items and compares audio of the video with the received audio to find matches. As a representative example of predetermined characteristics of embedded content, the embedded content extractor 240 may rely on matching information using the name of provider in transcript of audio, logo of provider identified in an image, a particular audio match, and so on. In a specific example, the audio match is based on a music or song associated with the provider of the embedded content.

The embedded content indexer 245 creates an index of the embedded content and associates the identity of each embedded content item with the identity of the distinct videos in which the embedded content occurs. In one embodiment, the embedded content indexer 245 performs the following sequence of steps. The embedded content indexer 245 receives an embedded content extracted by the embedded content extractor 240. The embedded content indexer 245 determines a unique identifier for the embedded content. For example, the embedded content indexer 245 generates a hash value based on characteristics of the embedded content item. The embedded content indexer 245 matches the hash value with hash values of previously extracted embedded content items. If the embedded content indexer 245 finds a match, the embedded content indexer 245 uses the matching embedded content (stored value) and skips the received embedded content item, or else, the embedded content indexer 245 stores the received embedded content item. Finally, the embedded content is associated with the video unless there is a previously stored association between the embedded content and the video.

Each user of the online system 100 is associated with a user profile stored in the user profile store 235. A user profile includes information about the user that was explicitly shared by the user and may also include profile information inferred by the online system 100. In one embodiment, a user profile includes multiple data fields, each describing one or more attributes of the corresponding user of the online system 100. Examples of information stored in a user profile include biographic, demographic, and other types of descriptive information, such as work experience, educational history, gender, hobbies or preferences, location and the like. A user profile may also store other information provided by the user, for example, images or videos.

While user profiles in the user profile store 235 are frequently associated with individuals, allowing individuals to interact with each other via the online system 100, user profiles may also be stored for entities such as businesses or organizations. This allows an entity to establish a presence on the online system 100 for connecting and exchanging content with other online system 100 users. The entity may post information about itself, about its products or provide other information to users of the online system 100 using a brand page associated with the entity's user profile. Other users of the online system 100 may connect to the brand page to receive information posted to the brand page or to receive information from the brand page. A user profile associated with the brand page may include information about the entity itself, providing users with background or informational data about the entity.

The online system 100 stores some test user profiles in the test user profile store 270. These test user profiles may not be associated with a real user, for example, a person, but are used for analyzing external video hosting systems 110. The test user profile store 270 stores test user profiles having different characteristics, for example, different demographic characteristics. For example, the test user profile store 270 may store certain user profiles having age within different age ranges, different ethnicity, different financial status, gender, and so on. The online system 100 interacts with a video hosting system 110 using a particular test profile to determine whether certain embedded content item is included in videos presented to users having user profiles matching the demographic attributes of the test user profile.

The content store 220 stores objects that represent various types of content items. Examples of content items represented by an object include a web page, a photograph, a video, a link, a shared content item, a gaming application achievement, a check-in event at a local business, a status update, a brand page, or any other type of content. Online system users may create objects stored by the content store 220, such as status updates, photos tagged by users to be associated with other objects in the online system 100, events, groups or applications. In some embodiments, objects are received from third-party systems separate from the online system 100, for example, from content provider systems 101.

The embedded content index 230 maps identifiers of extracted embedded content items with identifiers of videos embedding the embedded content. In one embodiment, the mapping is represented as a mapping table storing tuples comprising a pair, (embedded content identifier, video identifier). The online system 100 determines the embedded content identifier based on features of the embedded content, for example, length of embedded content, features of audio of the embedded content, images displayed in frames of the video, logos of content providers identified in frames of the embedded content, and so on. In an embodiment, the embedded content indexer 245 applies a hashing function to a vector representing these features to generate a unique identifier and saves the generated identifier in the embedded content index 230. In an embodiment, the video identifier is associated with the URL for accessing the video. For example, the video identifier may be obtained by applying a hash function to the URL of the video.

The embedded content parameters store 190 stores parameters describing distribution of embedded content to users of the external video hosting system. The parameter values stored in embedded content parameters store 190 are determined by the embedded content analyzer 180 (further described herein) by analyzing information associated with each embedded content item. The parameters describe information including the rate at which the embedded content is being shown to users, distribution of the rate across demographic profiles, budget associated with the embedded content, and so on. For example, the distribution of the rate across demographic profiles may represent the rate at which the embedded content is included for users having specific user profiles. As shown in FIG. 1, the embedded content parameters store 190 receives parameter values associated with an embedded content item from the embedded content analyzer 180. The embedded content parameters store 190 sends information describing distribution of embedded content to the reporting system 105.

The embedded content analyzer 180 includes a demographic analysis module 275, rate analysis module 285, and presentation analysis module 295. The embedded content analyzer 180 determines the various parameters of embedded content extracted by the embedded content extractor 240. In some embodiments, the embedded content analyzer 180 connects with the external video hosting system 110 using test user profiles having different demographic attributes, for example, by connecting one or more times with each type of test user profile at different times of the day. The embedded content analyzer 180 analyzes the information to identify patterns describing distribution of the embedded content via videos, for example, the demographic attributes of users targeted for the embedded content item, periodic variations in the distribution of the embedded content item, and so on. The embedded content analyzer 180 analyzes the distribution of the embedded content in different types of videos. The embedded content analyzer 180 includes different modules that analyze the distribution of the embedded content in different types of videos.

In some embodiments, the embedded content analyzer 180 uses a demographic analysis module 275 that performs the demographic analysis of embedded content based on age, gender, location, language, education, financial status, etc. This demographic analysis module 275 analyses the embedded content to determine the rate at which the embedded content is shown to users of different types of demographic characteristics.

In another embodiment, the embedded content analyzer 180 uses a rate analysis module 285 that performs the analysis of the rate of distribution of an embedded content. The embedded content analyzer 180 determines an aggregate rate at which the embedded content is presented to users by the video hosting system. Based on the determination of the rate, the embedded content analyzer 180 may estimate a budget of the content provider for distributing the embedded content item. The budget is determined as a value proportional to the rate of distribution of the embedded content item as determined by the embedded content analyzer 180.

In an alternate embodiment, the embedded content analyzer 180 includes a presentation analysis module 295 which analyzes the time at which the provider shows the embedded content. For example, the presentation analysis module 295 determines the time of day at which the embedded content is shown, days of the week the embedded content is shown, and so on. The presentation analysis module 295 analyzes the position or placement within a video for the embedded content, for example, whether the embedded content is embedded in the beginning of the video, end of the video, or the middle. In some embodiments, the presentation analysis module 295 collects information over longer periods of time to look for variations in the rate at which the embedded content is presented. For example, presentation analysis module 295 looks for changes in the rate of presentation of embedded content over a period of a month or across days of a week. In another embodiment, presentation analysis module 295 determines if there are variations in time based on demographics. For example, presentation analysis module 295 can analyze the variations in embedded contents presented at different times of the day for teenagers as compared to people in the age group 30-40.

Figure 3:
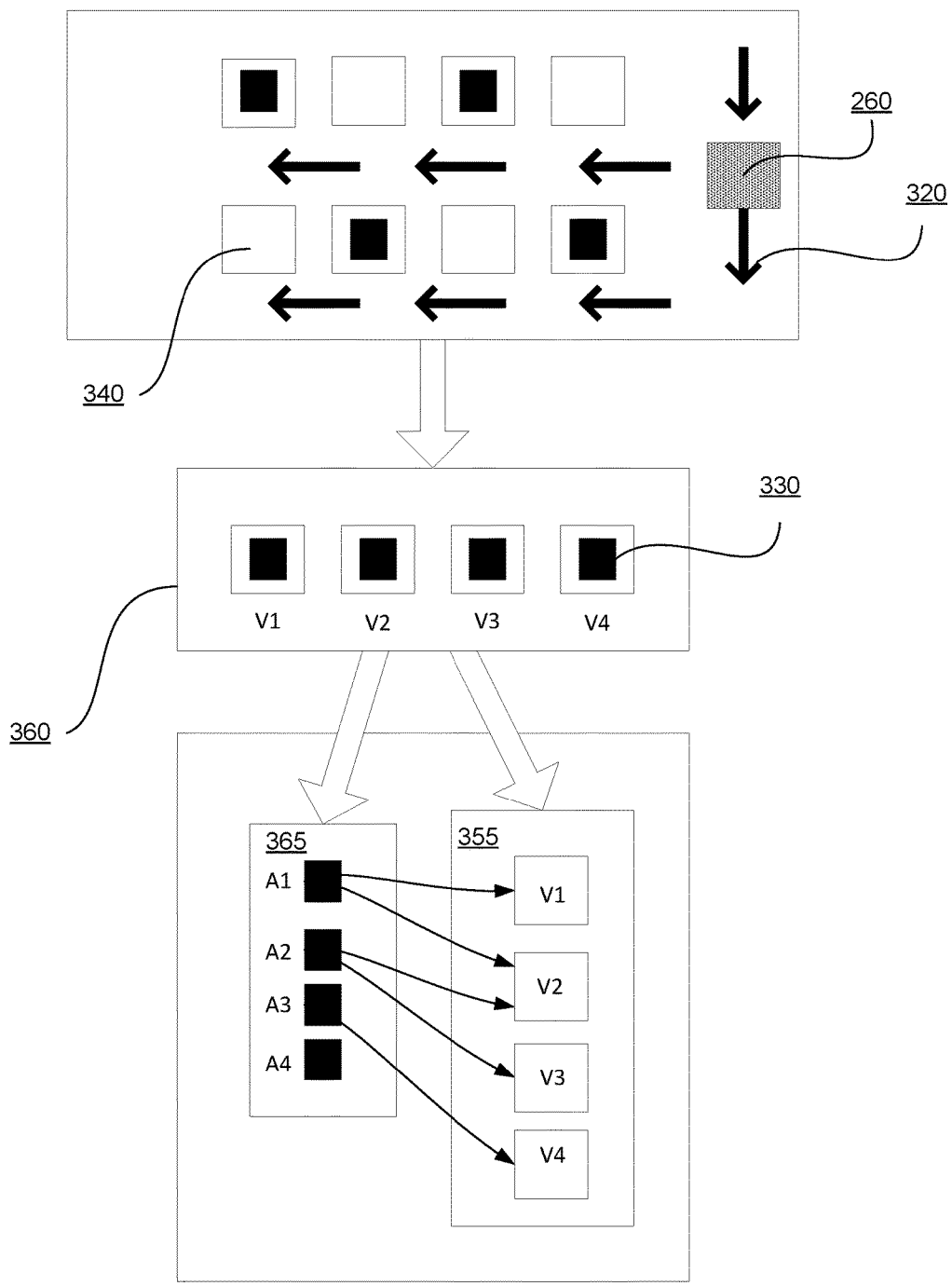
FIG. 3 is a representative diagram of an online system extracting embedded content items from a set of videos, in accordance with an embodiment of the invention.

FIG. 3 is a schematic representation of an online system extracting embedded contents from a set of videos in accordance with an embodiment of the invention. The video crawler 260 iterates 320 through the set of videos 340 as illustrated. The online system 100 identifies a set 360 of videos with embedded content 330 and indexes such videos using a video indexer. In the example shown in FIG. 3, the indices $V_1$, $V_2$, $V_3$ and $V_4$ represent the video indices of such videos with embedded content. The online system further invokes the embedded content extractor 240 to extract the embedded content 330 from the videos 340 and stores 365 the extracted embedded content. In addition, the embedded content indexer 245 assigns the unique indices for the extracted embedded content and stores them in the embedded content index store 230. In the example shown in FIG. 3, the embedded content indexer 245 indexes the extracted embedded content as $A_1$, $A_2$, $A_3$ and $A_4$.

In some embodiments, the online system 100 maps the embedded content with the videos embedding the embedded content such that for each embedded content, all videos embedding the embedded content can be identified. In the example shown in FIG. 3, the online system 100 maps the embedded content $A_1$ from the list of embedded contents 365 with the videos 355 indexed as $V_1$ and $V_2$, which correspond to the videos identified as embedding the embedded content $A_1$. Similar mapping of the other embedded contents with the videos follows a similar description which is apparent from the figure.

Overall Process

Figure 4:
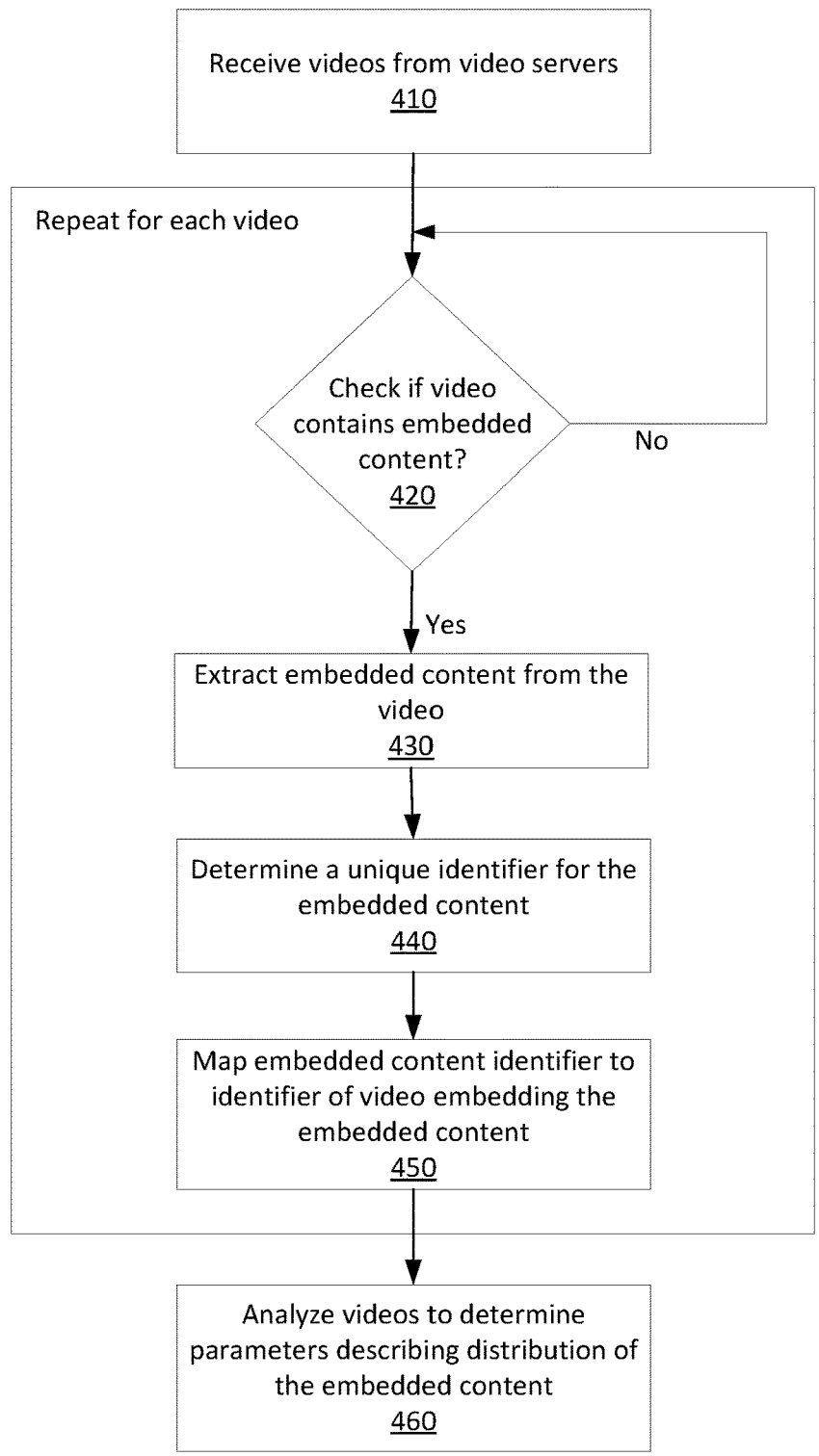
FIG. 4 is a flowchart illustrating the overall process of extraction of embedded content item from the video, in accordance with an embodiment of the invention.

FIG. 4 is a flowchart representing the overall process of extraction of embedded content from the video. The video crawler 260 receives 410 the video objects 130 from one or more external video hosting systems. For each video object received, the embedded content extractor 240 determines 420 whether the video object 130 includes an embedded content. The embedded content extractor 240 extracts 430 the embedded content from the video object 130. The embedded content extractor 240 identifies changes from one frame to another that indicate a transition from content of the video to embedded content. The changes identified by the embedded content extractor 240 include changes in volume, characteristics of the image of the frame, and so on. The embedded content extractor 240 uses other techniques to determine 420 whether the video object 130 includes an embedded content. In one example, the embedded content extractor 240 determines 420 whether the video object 130 includes an embedded content by matching audio within various portions of the video object with previously captured audio patterns that characterize certain embedded content, for example, certain music, songs, or specific keywords mentioned in a transcript of the audio. If a portion of audio of the video object is determined to match, the embedded content extractor 240 identifies the boundaries of the embedded content within the video based on matching of previously stored frames of embedded content with the frames of the video.

In an embodiment, the embedded content extractor 240 performs optical character recognition of the images of the video to identify text and match it against text that characterizes certain embedded content. The embedded content extractor 240 determines that the video contains embedded content if the text of the video matches the previously stored texts characterizing the embedded content. In an embodiment, the embedded content extractor 240 matches images of the video against image blocks or portions that characterize certain embedded content. Examples of image blocks or portions characterizing embedded content include logos of a content provider, logos associated with products, a banner from a content provider, or other image patterns found in embedded content associated with a content provider. If the embedded content extractor 240 determines that a portion of an image of the video matches a stored image block or portion associated with a content provider, the embedded content extractor 240 determines that the video contains embedded content associated with that content provider.

The matching of the embedded content extractor 240 also allows the online system 100 to identify a content provider of the embedded content. In an embodiment, the embedded content extractor 240 stores associations between various patterns that match the video and an identifier for the content provider that provides an embedded content matching the pattern. For example, the embedded content extractor 240 stores information indicating that embedded content from a particular content provider includes a particular song or music in embedded content. Accordingly, the embedded content extractor 240 determines a video including audio that matches the particular song or music to include embedded content. The embedded content extractor 240 determines the embedded content to be associated with the corresponding content provider system 101.

Figure 5:
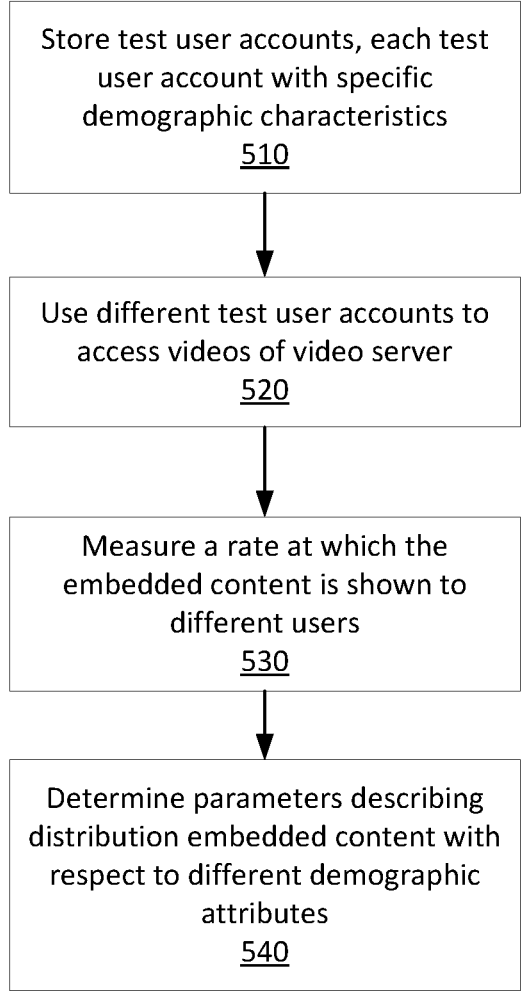
FIG. 5 is a flowchart illustrating the process for determining demographics of target audience for an embedded content item, in accordance with an embodiment of the invention.

The embedded content indexer 245 determines a unique identifier for the embedded content 150 and stores the unique identifier in the embedded content index 230. For each embedded content identified, the embedded content indexer 245 maps 450 the embedded content identifier to all video identifiers that include the embedded content. The embedded content analyzer 180 analyzes 460 videos to determine parameters describing the distribution of the embedded content to users in the video hosting system. Details of the analysis 460 are further provided herein, for example, as FIG. 5 is a flowchart illustrating the process for determining demographics of target audience for an embedded content item, in accordance with an embodiment of the invention. The test user profile store 270 stores 510 a plurality of test user accounts, each test user account associated with certain demographic characteristics. The online system register with the video hosting system as the test user accounts. Accordingly, the corresponding test user accounts are created in the video hosting system 110. The online system uses 520 different test user accounts to access different videos showing the same embedded content and measures 530 a rate at which the embedded content is included in the accessed video. The online system determines 540 parameters describing the distribution of embedded content item with respect to different demographic attributes.

In some embodiments, the demographic analysis module 275 determines for a particular demographic attribute, a histogram representing the rate of distribution of embedded content for sets of values or ranges of values of that demographic attribute. For example, if the demographic attribute is gender, the demographic analysis module 275 determines the rate for both male and female users. As another example, if the attribute is age, the demographic analysis module 275 determines the rate of distribution for different ranges of ages (e.g. ages in the range 15-20, 20-30, 30-45, etc.).

In alternate embodiments, the presentation analysis module 295 determines parameters describing changes in the distribution with respect to time. For example, the presentation analysis module 295 determines an aggregate distribution of the embedded content in various videos at different times of the day, different days of the week for all users. As another example, the, the presentation analysis module 295 determines an aggregate distribution of the embedded content in various videos at different times of the day, different days of the week for specific demographic groups of users.

The rate analysis module 285 aggregates a measure of rate of distribution of the embedded content over all videos embedding the embedded content item within a particular time period to determine an estimate of overall budget allocated by the content provider for distributing the embedded content item. The presentation analysis module 295 may measure of rate of distribution of the embedded content as the number of times the content is included in a video within a unit time, for example, an hour when the video is presented to the users. The presentation analysis module 295 may measure the rate of distribution across all users or across users having particular demographics. The rate of distribution measured by the presentation analysis module 295 gives a relative comparison of rates of distribution of embedded content by their corresponding content providers.

Figure 6:
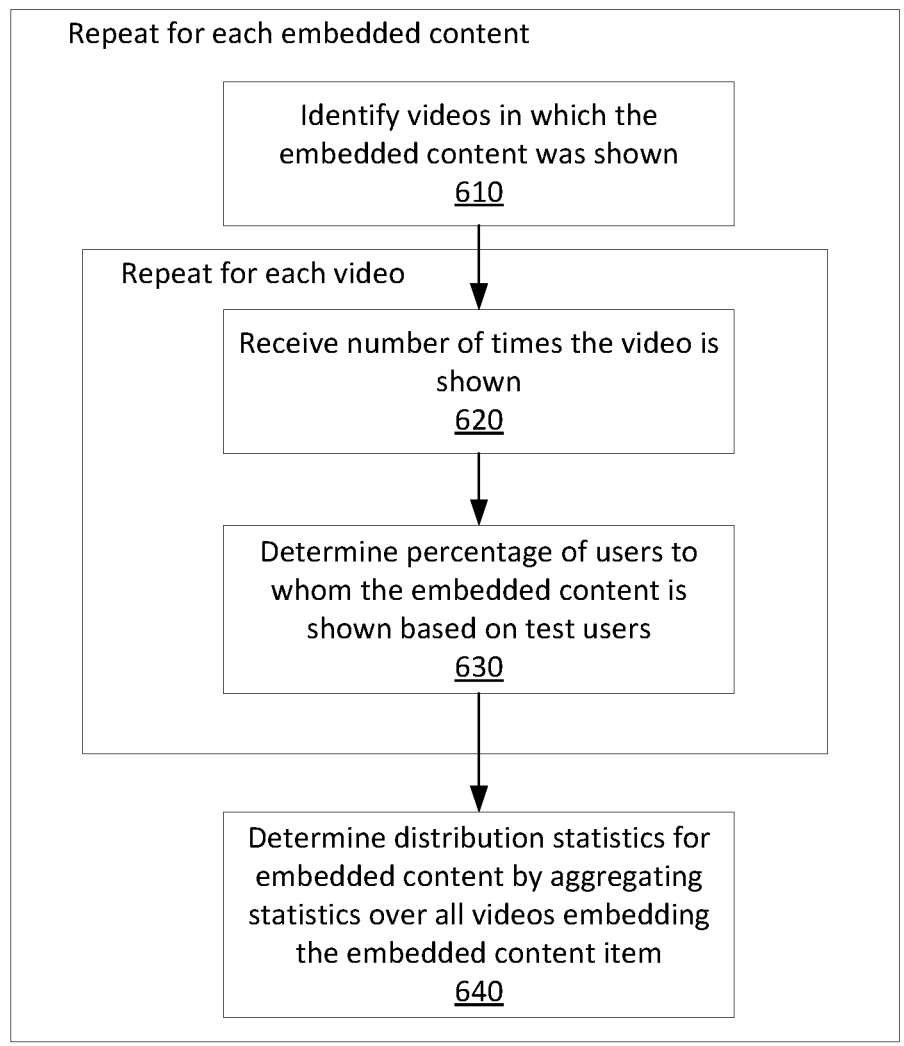
FIG. 6 is a flowchart illustrating a process for determining statistics describing distribution of an embedded content item, according to an embodiment.

FIG. 6 is a flowchart illustrating a process for determining statistics describing distribution of an embedded content item, according to an embodiment. The embedded content analyzer 180 repeats a sequence of steps for each embedded content item, for example, each embedded content item stored in the embedded content index 230. The embedded content analyzer 180 identifies 610 videos in which the content provider shows the embedded content using information stored in the embedded content index 230.

The embedded content analyzer 180 repeats the following steps for each video that includes the embedded content. For each video, the video crawler 260 receives 620 the number of times the video is presented to users using APIs (application programming interfaces) of the video hosting system 110. The video crawler 260 may invoke an API of the video hosting system that provides the number of times the video was shown in a given time range, for example, in the past week. Alternatively, the video crawler 260 may invoke an API of the video hosting system that provides the total number of views of the video since the time when the video was uploaded. The embedded content analyzer 180 determines an estimate of the rate at which the video is presented to users based on the retrieved parameter values.

The embedded content analyzer 180 calculates 640 distribution statistics for embedded content 150 by aggregating statistics over videos. The rate analysis module 285 determines 630 a percentage of users to whom the embedded content is shown based on test users. Accordingly, the rate analysis module 285 retrieves the video using one or more test user accounts multiple times. The rate analysis module 285 may retrieve the videos using test accounts having various demographic attributes. The rate analysis module estimates the demographic attributes to whom the embedded content is provided. The rate analysis module 285 determines an estimate of a number of users having the specific demographic attributes based on precomputed statistical estimates based on population samples. For example, the rate analysis module 285 may store histograms indicating the percentage of users having specific types of demographic attributes.

The rate analysis module 285 determines the number of times the embedded content is included in the videos based on the percentage of users having the specific demographic attributes. For example, if the rate analysis module 285 determines that the fraction of users of a population having the demographic attributes to whom the embedded content is distributed is M and a video V1 including the embedded content was distributed N times within a time interval, the number of times the embedded content item was presented to the users by the video hosting system 110 is a product of M and N. If the rate analysis module 285 determines that the embedded content item was included in multiple videos, the rate analysis module 285 estimates the number of times the embedded content item was included in each video and aggregates the values over all videos in which the embedded content was included.

Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by an online system, a plurality of videos from an external video hosting system;
identifying, by the online system, one or more content items embedded in videos from the plurality of videos;
extracting, by the online system, the one or more content items from the videos from the plurality of videos;
determining, by the online system, a unique identifier for each content item of the one or more content identifiers extracted;
storing, by the online system, an index mapping the unique identifier of each respective content item of the one or more content items to information identifying videos that embed the respective content item;
identifying for a particular content item of the one or more content items, a set of videos in which the external video hosting system embedded the particular content item based on the index;
receiving, from the external video hosting system, information describing a rate of distribution of videos from the set of videos in which the external video hosting system embedded the particular content item based on the index;
determining, by the online system, an aggregate rate of distribution of videos belonging to the set of videos in which the external video hosting system embedded the particular content item;
determining, by the online system, a rate at which the external video hosting system distributes the particular content item, the determining of the rate at which the external video hosting system distributes the particular content item being based on the aggregate rate of distribution of videos from the set of videos that embed the particular content item, wherein distribution for playback of a respective video of the set of videos is responsive to a request identifying the respective video and received from a client device, and wherein selection of the particular content item for distribution is tailored to a user of the client device;
distributing, by the online system, the particular content item by embedding the particular content item in videos distributed by the online system, wherein a rate of distribution of the particular content item by the online system is determined based on the determined rate at which the external video hosting system distributes the particular content item; and
configuring for presentation information describing the rate at which the external video hosting system distributes the particular content item.

2. The method of claim 1, wherein identifying the one or more content items embedded in the videos of the plurality of videos is based on identifying a change in volume of an audio from a frame to a subsequent frame, the change in volume exceeding a threshold.

3. The method of claim 1, wherein identifying the one or more content items embedded in the videos of the plurality of videos is based on identifying a pop-up image in a frame of the video.

4. The method of claim 1, further comprising:
identifying a content provider associated with the particular content item by identifying a logo associated with the content provider in a frame of a video of the set of videos.

5. The method of claim 1, further comprising:
identifying a content provider associated with the particular content item by comparing an audio of the video with one or more audios associated with the content provider.

6. The method of claim 1, further comprising:
identifying a content provider associated with the particular content item by identifying a text associated with the content provider in an audio transcript of the particular content item.

7. The method of claim 1, further comprising:
storing, by the online system, a plurality of test user accounts, each test user account associated with one or more demographic attributes;
sending, by the online system, a plurality of requests to access a video of the set of videos, the plurality of requests comprising one or more requests from each of the plurality of test user accounts;
verifying, by the online system, whether the video of the set of videos includes the particular content item responsive to sending a request via a test user account; and
determining, by the online system, values of demographic attributes of users for whom the particular content item is included in the video by the external video hosting system.

8. The method of claim 1, further comprising:
storing, by the online system, a plurality of test user accounts;
sending, by the online system, a plurality of requests to access a video, the plurality of requests originating from a test user account, each of the plurality of request associated with a particular time;

verifying, by the online system, whether the video includes the particular content item responsive to each of the plurality of requests; and determining, by the online system, a pattern of distribution of the particular content item via the video over time.

9. The method of claim 1, further comprising:

receiving, by the online system, a request for videos; and embedding, by the online system, the content items in the requested videos based on the determined rate at which the external video hosting system distributes the particular content item.

10. A non-transitory computer-readable storage medium storing instructions for:

receiving, by an online system, a plurality of videos from an external video hosting system;

identifying, by the online system, one or more content items embedded in videos from the plurality of videos;

extracting, by the online system, the one or more content items from the videos from the plurality of videos;

determining, by the online system, a unique identifier for each content item of the one or more content identifiers extracted;

storing, by the online system, an index mapping the unique identifier of each respective content item of the one or more content items to information identifying videos that embed the respective content item;

identifying for a particular content item of the one or more content items, a set of videos in which the external video hosting system embedded the particular content item based on the index;

receiving, from the external video hosting system, information describing a rate of distribution of videos from the set of videos in which the external video hosting system embedded the particular content item based on the index;

determining, by the online system, an aggregate rate of distribution of videos belonging to the set of videos in which the external video hosting system embedded the particular content item;

determining, by the online system, a rate at which the external video hosting system distributes the particular content item, the determining of the rate at which the external video hosting system distributes the particular content item being based on the aggregate rate of distribution of videos from the set of videos that embed the particular content item, wherein distribution for playback of a respective video of the set of videos is responsive to a request identifying the respective video and received from a client device, and wherein selection of the particular content item for distribution is tailored to a user of the client device;

distributing, by the online system, the particular content item by embedding the particular content item in videos distributed by the online system, wherein a rate of distribution of the particular content item by the online system is determined based on the determined rate at which the external video hosting system distributes the particular content item; and configuring for presentation information describing the rate at which the external video hosting system distributes the particular content item.

11. The non-transitory computer-readable storage medium of claim 10, wherein identifying the one or more content items embedded in the videos of the plurality of videos is based on identifying a change in volume of an audio from a frame to a subsequent frame, the change in volume exceeding a threshold.

12. The non-transitory computer-readable storage medium of claim 10, wherein identifying the one or more content items embedded in the videos of the plurality of videos is based on identifying a pop-up image in a frame of the video.

13. The non-transitory computer-readable storage medium of claim 10, further comprising:

identifying a content provider associated with the particular content item by identifying a logo associated with the content provider in a frame of a video of the set of videos.

14. The non-transitory computer-readable storage medium of claim 10, further comprising:

identifying a content provider associated with the particular content item by comparing an audio of the video with one or more audios associated with the content provider.

15. The non-transitory computer-readable storage medium of claim 10, further comprising:

identifying a content provider associated with the particular content item by identifying a text associated with the content provider in an audio transcript of the particular content item.

16. The non-transitory computer-readable storage medium of claim 10, further comprising:

storing, by the online system, a plurality of test user accounts, each test user account associated with one or more demographic attributes;

sending, by the online system, a plurality of requests to access a video of the set of videos, the plurality of requests comprising one or more requests from each of the plurality of test user accounts;

verifying, by the online system, whether the video of the set of videos includes the particular content item responsive to sending a request via a test user account; and determining, by the online system, values of demographic attributes of users for whom the particular content item is included in the video by the external video hosting system.

17. The non-transitory computer-readable storage medium of claim 10, further comprising:

storing, by the online system, a plurality of test user accounts;

sending, by the online system, a plurality of requests to access a video, the plurality of requests originating from a test user account, each of the plurality of request associated with a particular time;

verifying, by the online system, whether the video includes the particular content item responsive to each of the plurality of requests; and determining, by the online system, a pattern of distribution of the particular content item via the video over time.

18. The non-transitory computer-readable storage medium of claim 10, further comprising:

receiving, by the online system, a request for videos; and embedding, by the online system, the content items in the requested videos based on the determined rate at which the external video hosting system distributes the particular content item.

19. A computer system comprising:

a computer processor:

a non-transitory computer-readable storage medium storing instructions for execution by the computer processor, that, when executed by the computer processor, cause the computer processor to perform:

receiving, by an online system, a plurality of videos from an external video hosting system;

identifying, by the online system, one or more content items embedded in videos from the plurality of videos;

extracting, by the online system, the one or more content items from the videos from the plurality of videos;

determining, by the online system, a unique identifier for each content item of the one or more content identifiers extracted;

storing, by the online system, an index mapping the unique identifier of each respective content item of the one or more content items to information identifying videos that embed the respective content item;

identifying for a particular content item of the one or more content items, a set of videos in which the external video hosting system embedded the particular content item based on the index;

receiving, from the external video hosting system, information describing a rate of distribution of videos from the set of videos in which the external video hosting system embedded the particular content item based on the index;

determining, by the online system, an aggregate rate of distribution of videos belonging to the set of videos in which the external video hosting system embedded the particular content item;

determining, by the online system, a rate at which the external video hosting system distributes the particular content item, the determining of the rate at which the external video hosting system distributes the particular content item being based on the aggregate rate of distribution of videos from the set of videos that embed the particular content item, wherein distribution for playback of a respective video of the set of videos is responsive to a request identifying the respective video and received from a client device, and wherein selection of the particular content item for distribution is tailored to a user of the client device;

distributing, by the online system, the particular content item by embedding the particular content item in videos distributed by the online system, wherein a rate of distribution of the particular content item by the online system is determined based on the determined rate at which the external video hosting system distributes the particular content item; and configuring for presentation information describing the rate at which the external video hosting system distributes the particular content item.

20. The computer system of claim 19, wherein identifying the one or more content items embedded in the videos of the plurality of videos is based on identifying a change in volume of an audio from a frame to a subsequent frame, the change in volume exceeding a threshold.

\* \* \* \* \*